(12) United States Patent
Maeda et al.

(10) Patent No.: US 9,703,142 B2
(45) Date of Patent: Jul. 11, 2017

(54) SURFACE LIGHT SOURCE DEVICE AND LIQUID CRYSTAL DISPLAY DEVICE

(71) Applicant: MITSUBISHI ELECTRIC CORPORATION, Tokyo (JP)

(72) Inventors: Saki Maeda, Tokyo (JP); Nami Okimoto, Tokyo (JP); Eiji Niikura, Tokyo (JP); Tomohiko Sawanaka, Tokyo (JP); Hiroshi Kida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/823,031

(22) Filed: Aug. 11, 2015

(65) Prior Publication Data

US 2016/0054623 A1  Feb. 25, 2016

(30) Foreign Application Priority Data

Aug. 20, 2014 (JP) ................... 2014-167200

(51) Int. Cl.
*G02F 1/1335* (2006.01)
*F21V 8/00* (2006.01)

(52) U.S. Cl.
CPC ..... *G02F 1/133609* (2013.01); *G02B 6/0001* (2013.01); *G02F 1/133603* (2013.01)

(58) Field of Classification Search
None
See application file for complete search history.

(56) References Cited

U.S. PATENT DOCUMENTS

| 8,783,890 B2 | 7/2014 | Kasai | |
| 2012/0008308 A1* | 1/2012 | Adachi | G02B 6/0021 362/97.2 |
| 2012/0320310 A1* | 12/2012 | Adachi | G02B 5/045 349/64 |
| 2013/0258709 A1* | 10/2013 | Thompson | G02B 6/0025 362/608 |
| 2014/0286043 A1* | 9/2014 | Sykora | G02B 3/0062 362/607 |
| 2016/0202409 A1* | 7/2016 | Sykora | G02B 3/0068 362/607 |

FOREIGN PATENT DOCUMENTS

| JP | 2013-105076 A | 5/2013 |
| WO | WO 2012/002029 A1 | 1/2012 |

* cited by examiner

*Primary Examiner* — Ashok Patel
(74) *Attorney, Agent, or Firm* — Birch, Stewart, Kolasch & Birch, LLP

(57) ABSTRACT

A surface light source device includes a plurality of LEDs for emitting a plurality of light having different colors, and a light guide body for mixing the colors of the plurality of light and emitting light having colors mixed. The light guide body includes a light incident portion for causing the plurality of light to be individually incident, and a light emitting portion provided beside the light incident portion and changing propagation angles of the plurality of light which is incident from the light incident portion and propagated into the light guide body to mix colors, thereby controlling a quantity of light emission from the light guide body and a light emitting position.

7 Claims, 11 Drawing Sheets

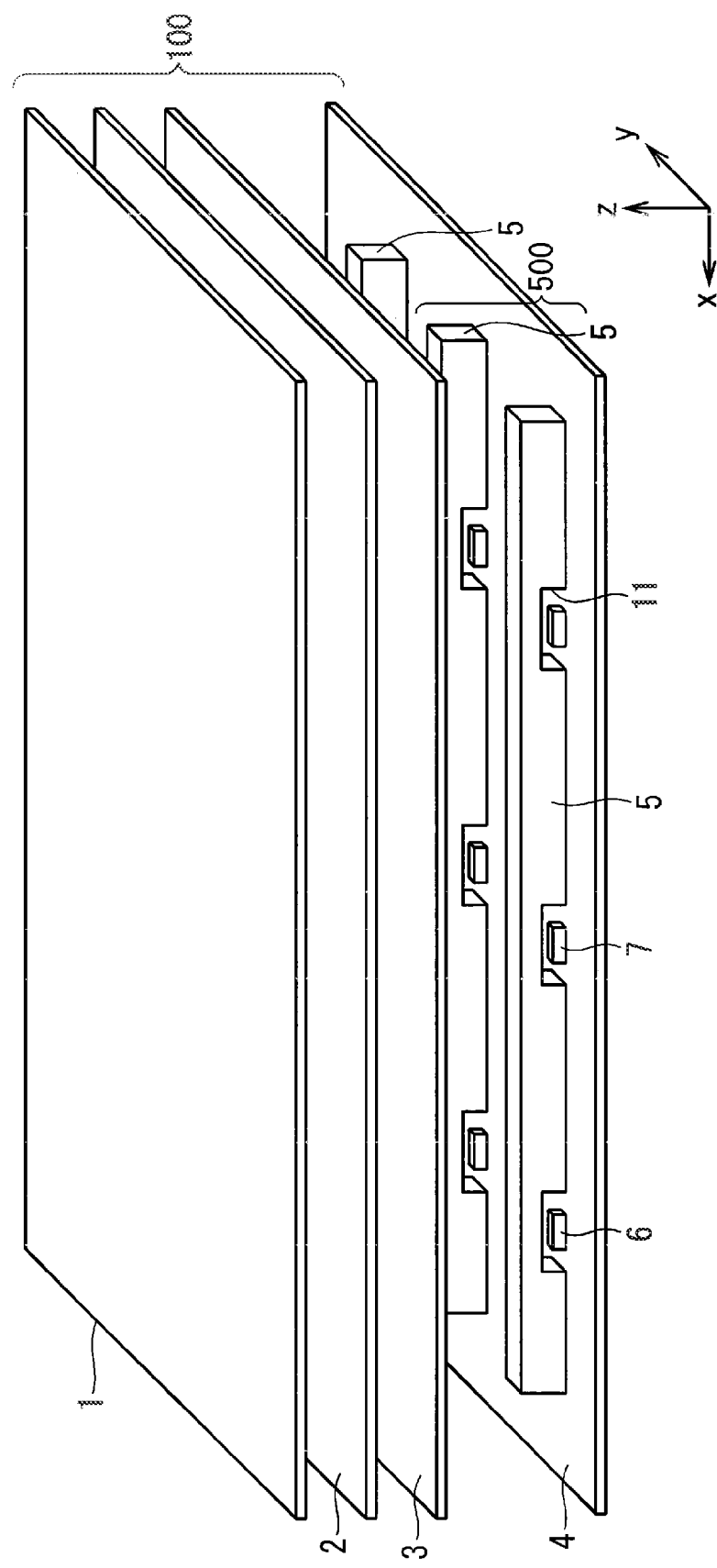
F I G. 1

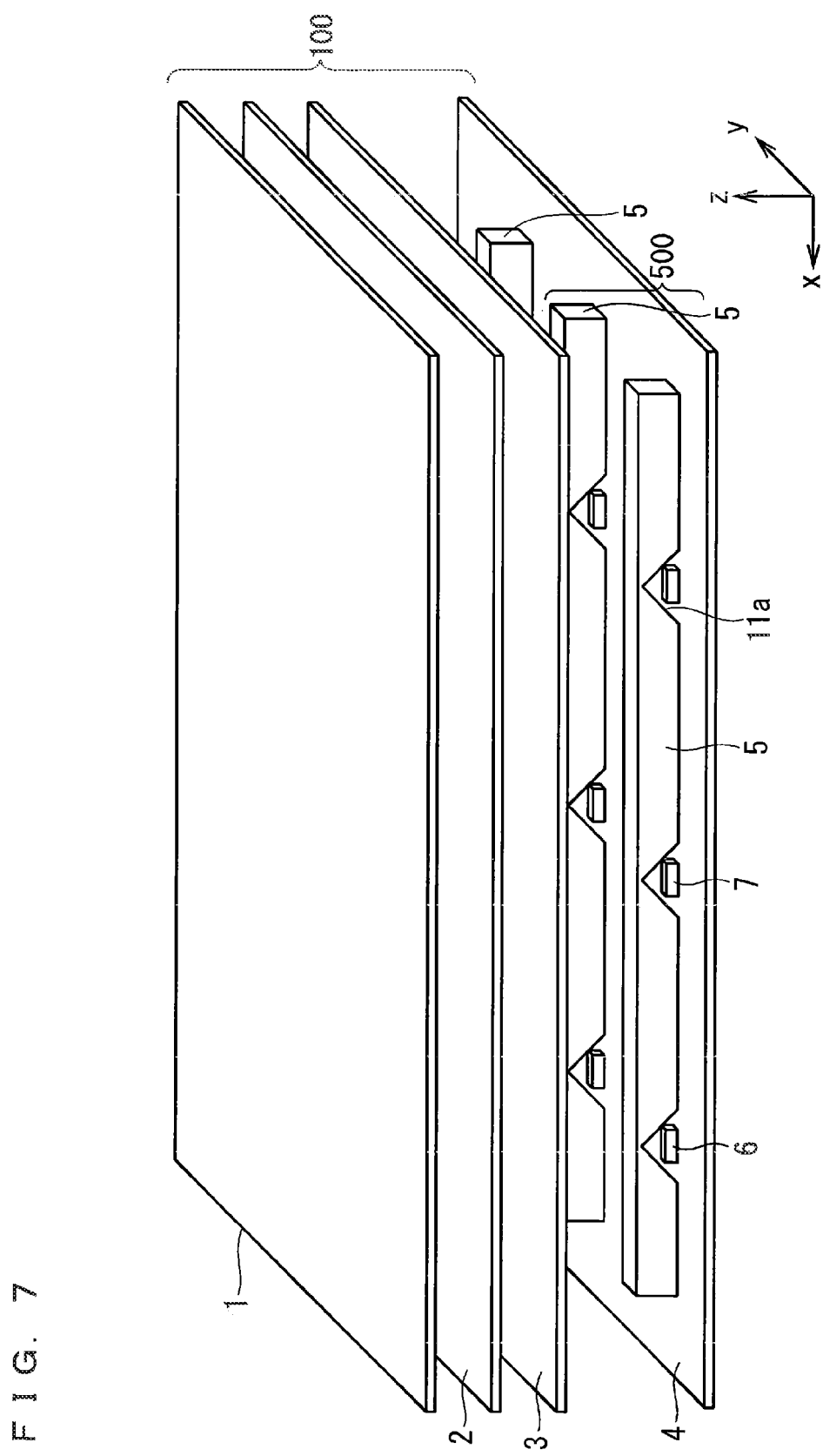
F I G. 7

SURFACE LIGHT SOURCE DEVICE AND LIQUID CRYSTAL DISPLAY DEVICE

BACKGROUND OF THE INVENTION

Field of the Invention

The present invention relates to a surface light source device for illuminating a back surface of a liquid crystal display element by at least two types of light sources having different characteristics, thereby displaying an image on the liquid crystal display element, and a liquid crystal display device including the surface light source device.

Description of the Background Art

A liquid crystal display element provided in a liquid crystal display device does not emit light by itself. For this reason, the liquid crystal display device includes a backlight device (a surface light source device) as a light source for illuminating the liquid crystal display element at a back surface side of the liquid crystal display element.

Moreover, the liquid crystal display element includes a color filter and transmits, through a color filter, only light having a part of wavelengths in light emitted from a fluorescent lamp for emitting white light in a continuous spectrum, thereby extracting display colors of red, green and blue to perform color representation. In the case in which only light in a part of wavelength bands is cut out of light source light in the continuous spectrum to obtain the display color, thus, a transmission wavelength band of the color filter provided in the liquid crystal display element should be set to be narrower if color purity of the display color is to be increased in order to enlarge a color reproduction range. For this reason, if the color purity of the display color is to be increased, there is a problem in that a quantity of light transmitted through the color filter is decreased, resulting in reduction in a luminance.

A fluorescent lamp to be generally employed as a light source of a backlight device has a light emission spectrum with a peak in a wavelength shifted to an orange color of approximately 615 nm in a red wavelength range based on a characteristic of a phosphor. If the color purity is to be increased in a wavelength region of 630 to 640 nm which is preferable as pure red in the red color, therefore, there is a problem in that the quantity of transmitted light is extremely reduced, resulting in significant reduction in a luminance. In order to enlarge the color reproduction range while minimizing a light loss caused by the color filter, it is necessary to employ a light source for emitting light having a narrow wavelength bandwidth. In other words, it is necessary to employ a light source for emitting light having high color purity.

As a measure for solving the problems, in recent years, there has been proposed a liquid crystal display device including, as a light source, a monochromatic LED or laser having a narrow wavelength width, that is, high color purity. In particular, the laser has excellent monochromaticity and high light emission efficiency. Therefore, it is possible to obtain a liquid crystal display device having a large color reproduction area, providing an image of high quality with a high luminance, and having low power consumption.

In the liquid crystal display device including the surface light source device, there has been desired technological development capable of reducing a manufacturing cost by implementing a surface light source device of high quality having a high color reproducing characteristic and less luminance unevenness and color irregularity by using light sources in a number which is as small as possible.

For example, WO2012/002029 discloses a liquid crystal display device including a directly under type backlight having a large number of LED light sources with lenses provided on a back surface of a liquid crystal display element. A lens considering light distribution is attached to each of LED light sources for R, G and B to be point light sources. Consequently, a uniform surface light source having luminance unevenness reduced is fabricated.

The surface light source device and the liquid crystal display device described in WO2012/002029 hold uniform luminance distribution by spreading and disposing the LED light source with the lens over a parallel surface with the back surface of the liquid crystal display element. For this reason, a large number of LED light sources are required so that a manufacturing cost is increased.

Furthermore, it is effective to increase the number of the LED light sources in order to enhance the luminance of the surface light source device. However, in order to cause the LED light sources to mix respective colors of light emitted therefrom so as to form a uniform white light, it is necessary to take the number and arrangement of the LED light sources into consideration, which is not easy.

SUMMARY OF THE INVENTION

It is an object of the present invention to provide a surface light source device and a liquid crystal display device which can display an image of high quality which is inexpensive and has a wide color reproduction range when simultaneously using at least two types of LED light sources or more as a light source of a surface light source device.

The surface light source device according to the present invention includes a plurality of light sources for emitting a plurality of light having different colors, and a light guide body for mixing the colors of the plurality of light and emitting light having colors mixed. The light guide body includes a light incident portion for causing the plurality of light to be individually incident, and a light emitting portion provided, beside the light incident portion and for changing propagation angles of the plurality of light which is incident from the light incident portion and propagated into the light guide body to mix colors, thereby controlling a quantity of light emission from the light guide body and a light emitting position.

The liquid crystal display device according to the present invention includes the surface light source device and a liquid crystal panel for displaying an image by illumination of light from the surface light source device.

The light guide body includes a light incident portion for causing the plurality of light to be individually incident, and a light emitting portion provided beside the light incident portion and for changing propagation angles of the plurality of light which is incident from the light incident portion and propagated into the light guide body to mix colors, thereby controlling a quantity of light emission from the light guide body and a light emitting position. Therefore, the colors of the plurality of light from the plurality of light sources are mixed in the light guide body and the light can be thus guided without waste. Consequently, utilization efficiency of the light can be enhanced and an image of high quality having a wide color reproduction range can be displayed. Moreover, it is possible to obtain the advantage without requiring a large number of light sources. Therefore, the surface light source device and the liquid crystal display device can be implemented at low cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view schematically showing a structure according to an example of a liquid crystal display device in accordance with a first preferred embodiment;

FIG. 7 is a perspective view schematically showing a structure according to an example of a liquid crystal display device in accordance with a second preferred embodiment;

DESCRIPTION OF THE PREFERRED EMBODIMENTS

First Preferred Embodiment

Figure 2:
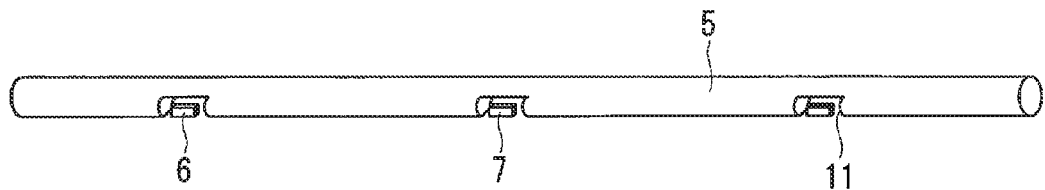
FIG. 2 is a perspective view schematically showing a structure according to another example of a light guide body in accordance with the first preferred embodiment.
Figure 3:
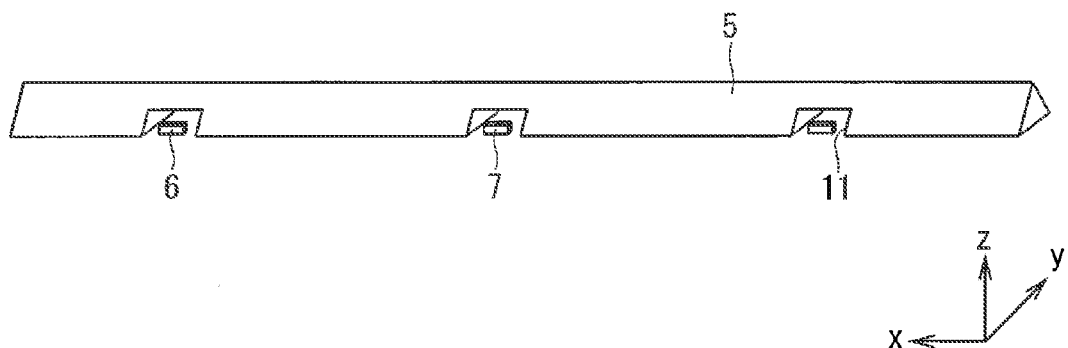
FIG. 3 is a perspective view schematically showing a structure according to a still another example of the light guide body in accordance with the first preferred embodiment.
Figure 5A:
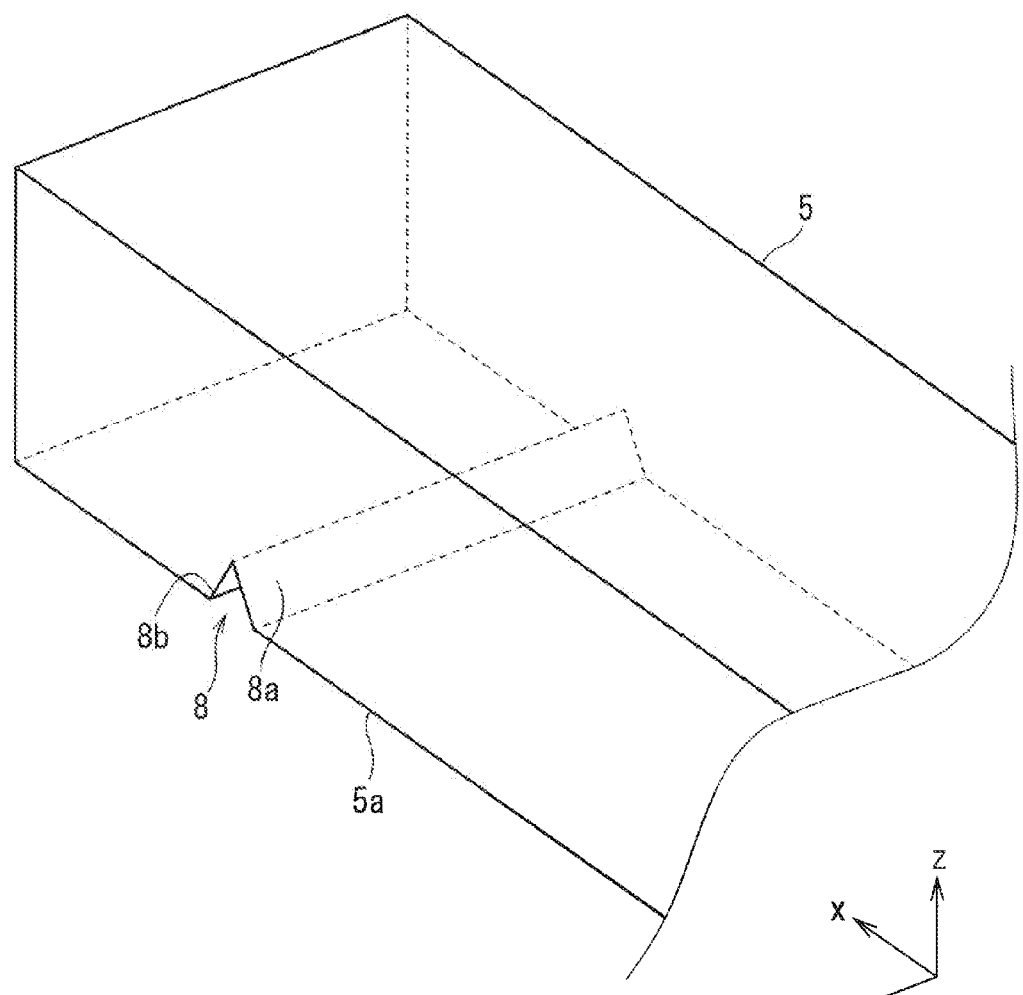
FIGS. 5A and 5B are perspective views showing the structure of the light guide body according to the first preferred embodiment.
Figure 5B:
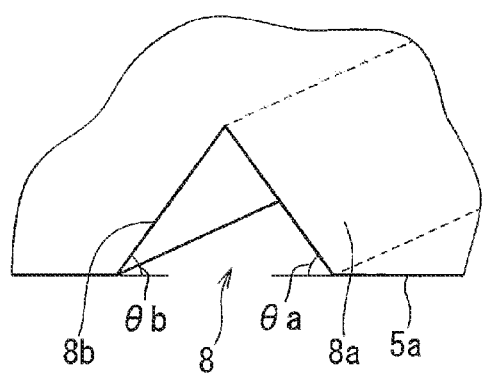
Figure 6:
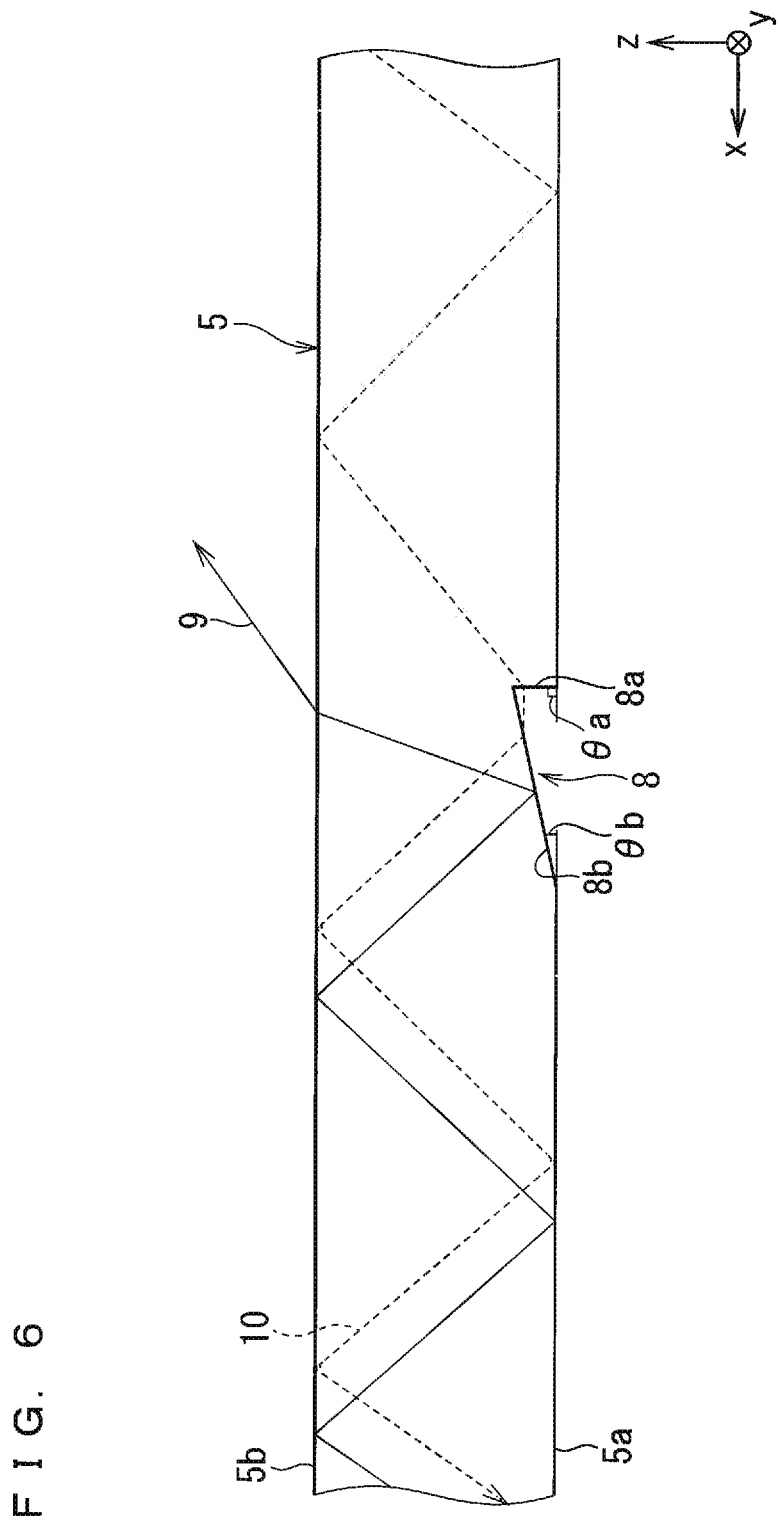
FIG. 6 is a configuration view schematically showing a function of a light emitting portion according to the first preferred embodiment.

A first preferred embodiment according to the present invention will be described below with reference to the drawings. FIG. 1 is a perspective view schematically showing a structure according to an example of a liquid crystal display device 100 in accordance with a first preferred embodiment, FIG. 2 is a perspective view schematically showing a structure according to another example of a light guide body 5, FIG. 3 is a perspective view schematically showing a structure according to a still another example of the light guide body 5, FIG. 4 is a configuration view schematically showing a structure of the light guide body 5 of a surface light source device 500, FIG. 5A is a perspective view showing the structure of the light guide body 5, FIG. 5B is a perspective view showing a structure of a light emitting portion 8, and FIG. 6 is a configuration view schematically showing a function of the light emitting portion 8.

As shown in FIG. 1, the liquid crystal display device 100 includes a transmission type liquid crystal panel 1, an optical sheet 2, an optical sheet 3, and the surface light source device 500. The surface light source device 500 serves to illuminate a back surface of the liquid crystal panel 1 through the optical sheet 3 and the optical sheet 2. Moreover, the surface light source device 500 includes an LED 6 (a light source) for emitting monochromatic light, an LED 7 (a light source) for emitting monochromatic light which is different from the LED 6, a plurality of light guide bodies 5 for mixing these light, and an optical sheet 4 for reflecting light emitted from the LEDs 6 and 7 toward the back surface of the liquid crystal panel 1. The liquid crystal panel 1, the optical sheet 2, the optical sheet 3 and the surface light source device 500 are disposed in order from a +z-axis direction to a −z-axis direction.

The light guide body 5 is a bar-shaped member made of a transparent resin such as acryl or polycarbonate and is formed into a rectangular parallelepiped shape, for example. The light guide body 5 propagates the light emitted from the LEDs 6 and 7 to an inner part through total reflection and mixes the colors of the monochromatic light of the LEDs 6 and 7, and emits light having a mixed color. Herein, the color mixture indicates that luminance distribution in emission to the light guide body 5 through the LEDs 6 and 7 having different incident positions is matched to some degree.

Figure 4:
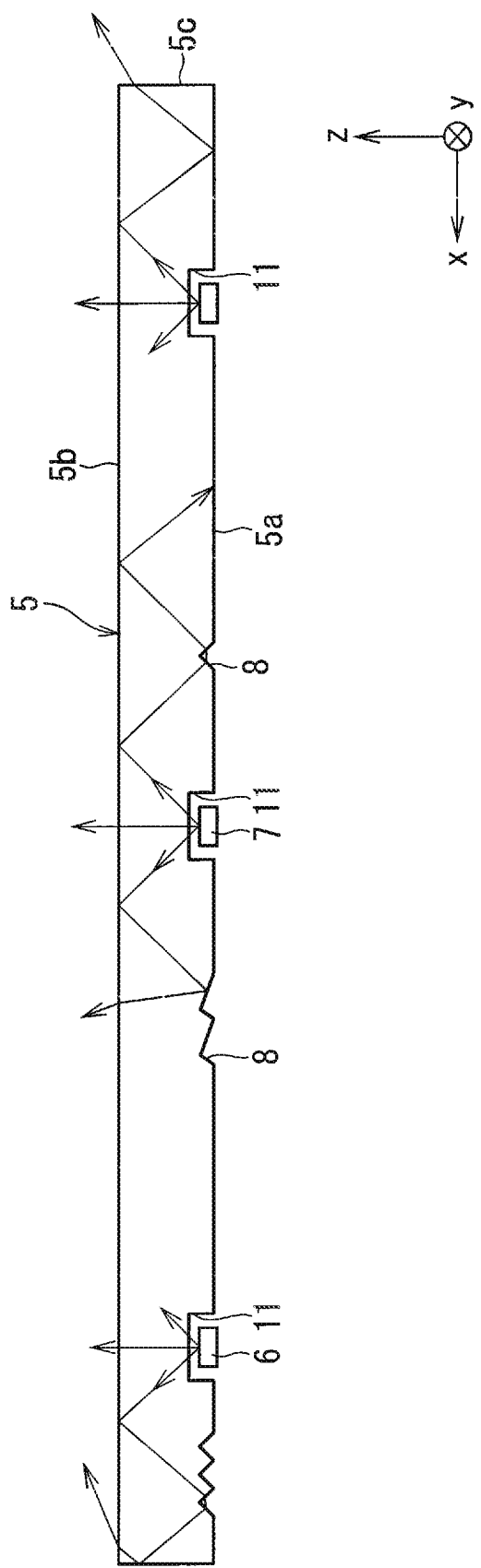
FIG. 4 is a configuration view schematically showing a structure of the light guide body of the surface light source device according to the first preferred embodiment.

As shown in FIGS. 1 and 4, moreover, the light guide body 5 includes a recessed light incident portion 11 and a light emitting portion 8. The light incident portions 11 are provided on the incident surface side of the light guide body 5, that is, a surface of the light guide body 5 which is placed in contact with the optical sheet 4 (a bottom surface 5a shown in FIG. 4). The light incident portion 11 is formed to be a square-pole-shaped recessed portion, and the LEDs 6 and 7 are separately disposed in the light incident portions 11. For this reason, the light emitted from the LEDs 6 and 7 can be individually incident on the light guide body 5 with a high probability, and the light can be efficiently taken into the light guide body 5. The light taken into the light guide body 5 repeats the total reflection in the light guide body 5. By utilizing the repetition, therefore, it is possible to propagate the light from the LEDs 6 and 7 to ends of the light guide body 5.

Although the description has been given on the assumption that the light guide body 5 is formed into the rectangular parallelepiped shape in the present preferred embodiment, the present invention is not restricted thereto. For example, the light guide body 5 may be formed cylindrically as shown in FIG. 2 or may be formed into a triangular prism shape as shown in FIG. 3. Although the light emitting portion 8 is not shown in FIGS. 2 and 3, the light emitting portion 8 is actually provided beside the light incident portion 11 in the same manner as in FIG. 4.

As shown in FIG. 4, moreover, the light emitting portion 8 is provided beside the light incident portion 11, that is, the incident surface side of the light guide body 5. The light emitting portion 8 intentionally disturbs totally reflecting conditions of light having respective colors which are taken into the light guide body 5 and emits light from the LEDs 6 and 7 to the outside of the light guide body 5. The light emitting portion 8 changes a propagation angle of light to be propagated through the inner part of the light guide body 5, thereby controlling a quantity of emission of the light propagated through the inner part of the light guide body 5 to the outside of the light guide body 5 and a light emitting position in a longitudinal direction of the light guide body 5. Herein, the light incident individually from the LEDs 6 and 7 is propagated in the light guide body 5 and is emitted from an emitting surface (an upper surface 5b of the light guide body 5) with the propagation angle changed through the light emitting portion 8 in FIG. 4. However, it is assumed that the colors of the light from the LEDs 6 and 7 actually mixed during the propagation with the propagation angle changed through the light emitting portion 8 in the light guide body 5, and then light having colors changed is emitted from the emitting surface.

As shown in FIGS. 5A and 5B, the light emitting portion 8 is formed to be a recessed portion having a triangular prism shape with the upper surface 5b (the emitting surface) side of the light guide body 5 set to be an apex. The light emitting portion 8 includes an inclined surface 8a having an optional angle θa of 0° to 90° to a bottom surface of the triangular prism and an inclined surface 8b which is opposite to the inclined surface 8a and has an optional angle θb of 0° to 90° to the bottom surface of the triangular prism with respect to the bottom surface 5a (the incident surface) of the light guide body 5. By the inclined surfaces 8a and 8b, it is possible to control internal propagation light traveling in a +x-axis direction or a −x-axis direction over an x axis to be the longitudinal direction of the light guide body 5. Moreover, the light emitting portion 8 includes a triangular prism shape in which inclined surfaces (sides) have different angles, that is, the light guide body 5 is provided with the light emitting portion 8 having the triangular prism shape at various angles.

For example, as shown in FIG. 6, light 9 which is being propagated in a −x direction by total reflection is emitted to the outside of the light guide body 5 with totally reflecting conditions disturbed by the inclined surface 8b where the angle θb of the light emitting portion 8 is 15°. On the other hand, light 10 which is being propagated in a +x direction by the total reflection is incident on the inclined surface 8a where the angle θa of the light emitting portion 8 is 90°, and is once refracted to come out of the light guide body 5, and is propagated through an air layer and is then propagated in the light guide body 5 by the total reflection again. By regulating the angles of the inclined surfaces 8a and 8b in the light emitting portion 8, thus, it is possible to control a quantity of emission of the light propagated in the light guide body 5 to the outside of the light guide body 5 and a light emitting position.

Consequently, the whole light guide body 5 can have uniform luminance distribution in a longitudinal direction. The surface light source device 500 provided with the light guide bodies 5 having the uniform luminance distribution can be treated as a surface light source having the uniform luminance distribution. Regardless of a position of the light source, furthermore, light from each light source can have almost equivalent luminance distribution in emission from the light guide body 5. For this reason, color irregularity is less likely to occur. In addition, the respective light sources are monochromatic LEDs. Therefore, a color reproduction range can be held widely. Moreover, the light from the LEDs 6 and 7 is propagated to the whole light guide body 5 and is used with extension in the longitudinal direction. For this reason, a small number of light sources can also illuminate a wide range.

As described above, in the surface light source device 500 according to the first preferred embodiment, the light guide body 5 includes the light incident portion 11 for causing a plurality of light to be individually incident thereon, and the light emitting portion 8 provided beside the light incident portion 11 and for changing propagation angles of the plurality of light which is incident from the light incident portion 11 and propagated in the light guide body 5 to mix colors, thereby controlling a quantity of light emission from the light guide body 5 and a light emitting position. Moreover, the liquid crystal display device 100 includes the surface light source device 500 and the liquid crystal panel 1 for displaying an image by illumination of light from the surface light source device 500.

Accordingly, the light from the LED 6 and the light from the LED 7 have colors mixed in the light guide body 5 so that light guide can be carried out without waste. Consequently, it is possible to enhance utilization efficiency of the light and to display an image of high quality with a wide color reproduction range. Moreover, the light from the LEDs 6 and 7 is propagated to the whole light guide body 5 and is used with extension in the longitudinal direction. Therefore, a small number of light sources can also illuminate a wide range. Thus, it is possible to obtain the advantage without requiring a large number of light sources. Consequently, the surface light source device 500 and the liquid crystal display device 100 can be implemented at low cost.

From the foregoing, in the surface light source device 500 and the liquid crystal display device 100, it is possible to reduce a size and energy consumption.

The light incident portion 11 is provided on the incident surface side of the light guide body 5 and the light emitting portion 8 is provided on the incident surface side of the light guide body 5 and controls a quantity of light emission from the emitting surface to be opposite to the incident surface and a light emitting position. Therefore, light having colors mixed in the light guide body 5 can be emitted efficiently toward the back surface of the liquid crystal panel 1.

The light emitting portion 8 is formed to be a recessed portion having a triangular prism shape with the emitting surface side of the light guide body 5 set to be an apex. By setting the angle of the inclined surface (side) of the recessed portion having the triangular prism shape, therefore, it is possible to easily set the propagation angle of the light.

The light emitting portion 8 includes the triangular prism shape having different angles of the inclined surfaces (sides). Therefore, it is possible to set the propagation angle of the light into various angles. Thus, it is possible to mix colors of the light from the LEDs 6 and 7 still more efficiently.

The plurality of light emitting portions 8 may be disposed continuously. Moreover, the light emitting portion 8 may be provided on the upper surface 5b or the side surface 5c in addition to the bottom surface 5a of the light guide body 5.

Moreover, the monochromatic LED serving as the light source for the single light guide body 5 is not restricted to two types (two colors) but three types (three colors) or more may be disposed. Furthermore, the number of the light sources for the single light guide body 5 may be three or more. In addition, the number of the light guide bodies 5 can be varied as necessary.

Second Preferred Embodiment

Figure 8:
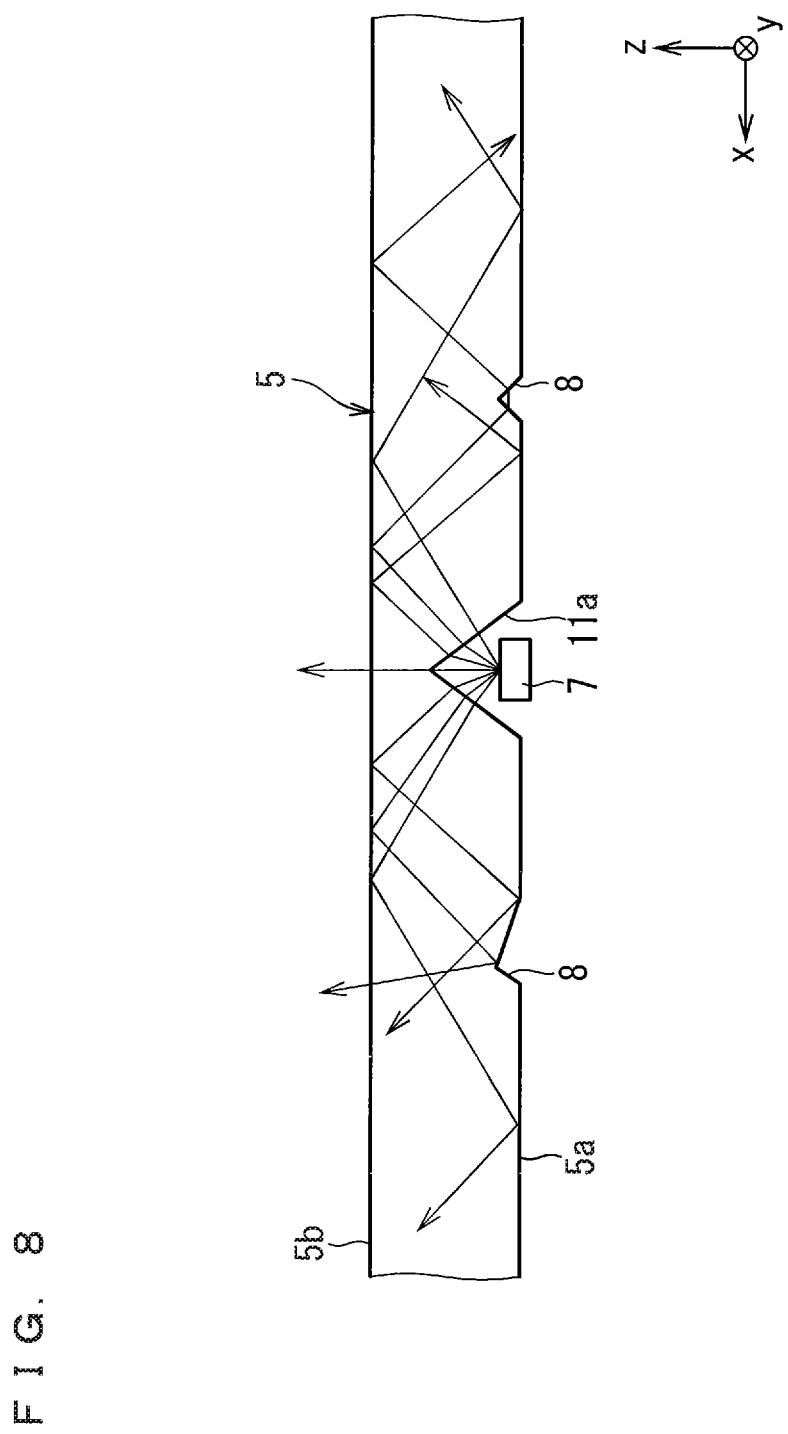
FIG. 8 is a configuration view schematically showing a function of a light emitting portion according to the second preferred embodiment.

Next, a liquid crystal display device 100 and a surface light source 500 according to a second preferred embodiment will be described. FIG. 7 is a perspective view schematically showing a structure according to an example of the liquid crystal display device 100 in accordance with the second preferred embodiment, and FIG. 8 is a configuration view schematically showing a function of a light incident portion 11a. In the second preferred embodiment, the same components as those described in the first preferred embodiment have the same reference numeral and explanation thereof will be omitted.

As shown in FIG. 7, in the second preferred embodiment, the light guide body 5 includes the light incident portion 11a obtained by deforming the recessed light incident portion 11 in place of the recessed light incident portion 11 in the structure according to the first preferred embodiment.

In order to reduce color irregularity in the surface light source device 500, it is preferable that light emitted from LEDs 6 and 7 should be taken into the light guide body 5 as much as possible because the light is monochromatic, be propagated and be emitted out of the light guide body 5 so as to have the same luminance distribution of each of the LEDs 6 and 7 as greatly as possible. In order to take the light emitted from the LEDs 6 and 7 into the light guide body 5 still more efficiently, moreover, the light emitted from the LEDs 6 and 7 is required to be refracted up to an angle that is a totally reflecting condition of acryl, a resin or the like to be a material of the light guide body 5 in such a manner that incident light is totally reflected by the upper surface 5b when the emitted light is incident on the light guide body 5 from a bottom surface 5a of the light guide body 5.

As shown in FIG. 8, the light incident portion 11a is provided on the bottom surface 5a of the light guide body 5 and is formed to be a recessed portion having a triangular prism shape with the upper surface 5b side of the light guide body 5 set to be an apex. The light incident portion 11a is formed to have such a shape as to hollow out the light guide body 5 like a triangular prism. The LEDs 6 and 7 are disposed in the light incident portion 11a in such a manner that apexes of the triangular prism are positioned on centers of and just above the LEDs 6 and 7. Light propagated from the LEDs 6 and 7 to an inner part of the light guide body 5 is divided in ±x directions by inclined surfaces of the triangular prism, and most of the light is totally reflected by the upper surface 5b and is propagated into the light guide body 5. Consequently, a quantity of the light transmitted through the light guide body 5 from the centers of the LEDs 6 and 7 and passing directly upward is decreased and a quantity of the light propagated to the inner part of the light guide body 5 by the total reflection is increased.

When the quantity of the light propagated to the inner part of the light guide body 5 is increased, a quantity of the light emitted to the outside of the light guide body 5 after luminance distribution of the light is controlled by a light emitting portion 8 is increased. Therefore, the color irregularity of the whole light guide body 5 can be thus reduced. Moreover, the luminance of the whole light guide body 5 can be increased, and the quantity of the light emitted by the light emitting portion 8 can also be controlled easily. Therefore, luminance unevenness can be thus reduced.

In order to efficiently divide the light of the LEDs 6 and 7 in the ±x directions by the light incident portion 11a, it is desirable that the inclined surface of the triangular prism of the light incident portion 11a should be steep to such a degree that the light guide body 5 does not penetrate therethrough. Moreover, it is desirable that angles of the apex parts of the triangular prism positioned just above the LEDs 6 and 7 should be as small as possible. As shown in FIG. 6, the light incident portion 11a includes the inclined surface of the triangular prism so that the light from the LEDs 6 and 7 can be divided in the ±x directions. Therefore, still more light can be propagated to the inner part of the light guide body 5. Moreover, an apex part having a small angle is present. Therefore, it is possible to reduce the quantity of the light transmitted just above the LED.

The light incident portion 11a is easily incident on the light guide body 5 if the upper side of the LED has an inclined surface of the triangular prism. For this reason, the shape of the light incident portion 11a is not restricted thereto. For example, it is also possible to take a shape in which a triangular prism is superposed on a rectangular parallelepiped or a shape in which the triangular prism overlaps a cylinder.

As described above, in the surface light source device 500 according to the second preferred embodiment, the light incident portion 11a is formed to be the recessed portion having the triangular prism shape with the upper surface 5b side of the light guide body 5 set to be the apex. Therefore, the light from the LEDs 6 and 7 can be divided in the ±x directions. Thus, still more light can be propagated to the inner part of the light guide body 5. Moreover, an apex part having a small angle is present. Consequently, it is possible to reduce the quantity of the light transmitted just above the LEDs 6 and 7.

Third Preferred Embodiment

Figure 9:
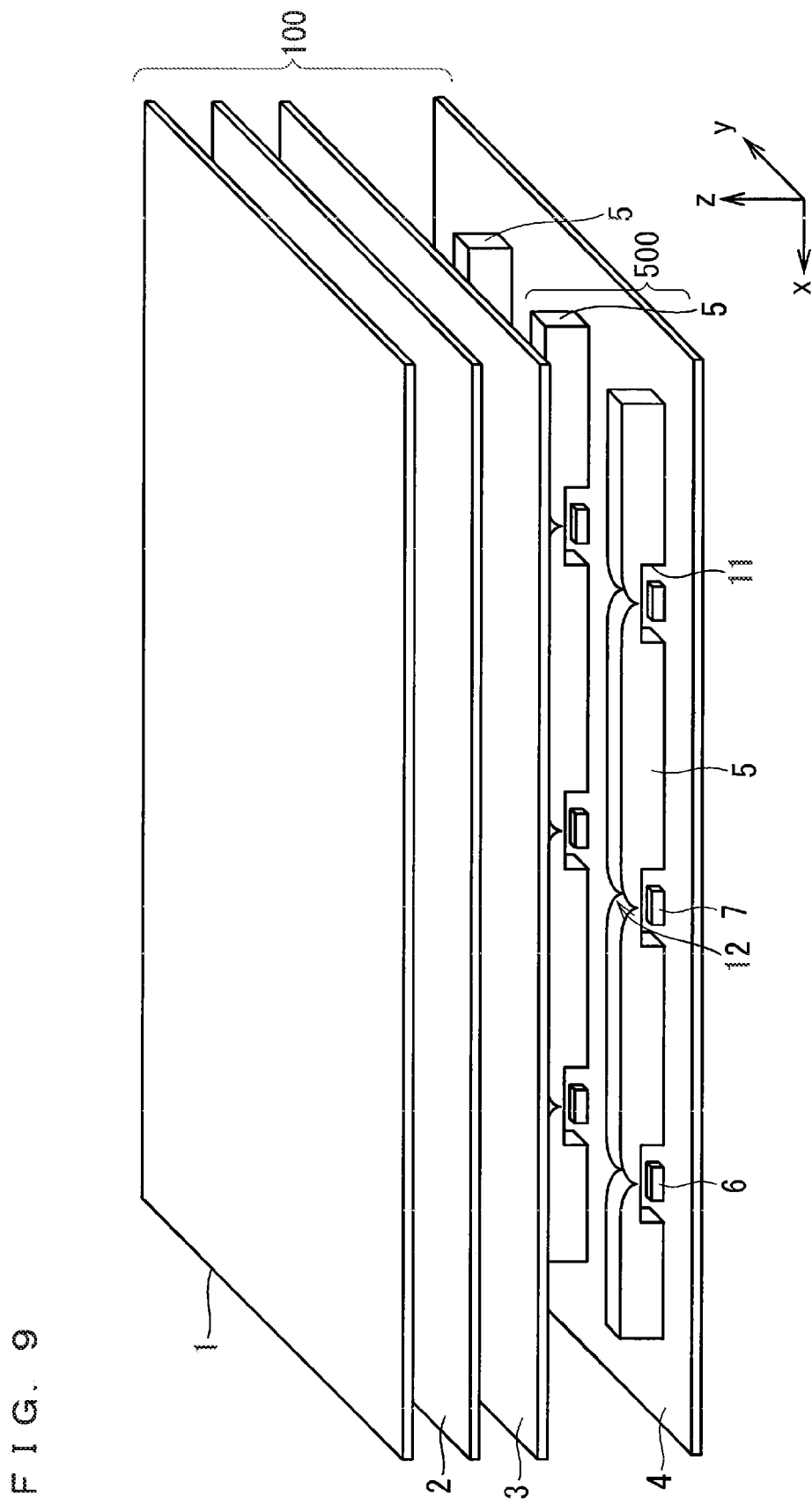
FIG. 9 is a perspective view schematically showing a structure according to an example of a liquid crystal display device in accordance with a third preferred embodiment.
Figure 10:
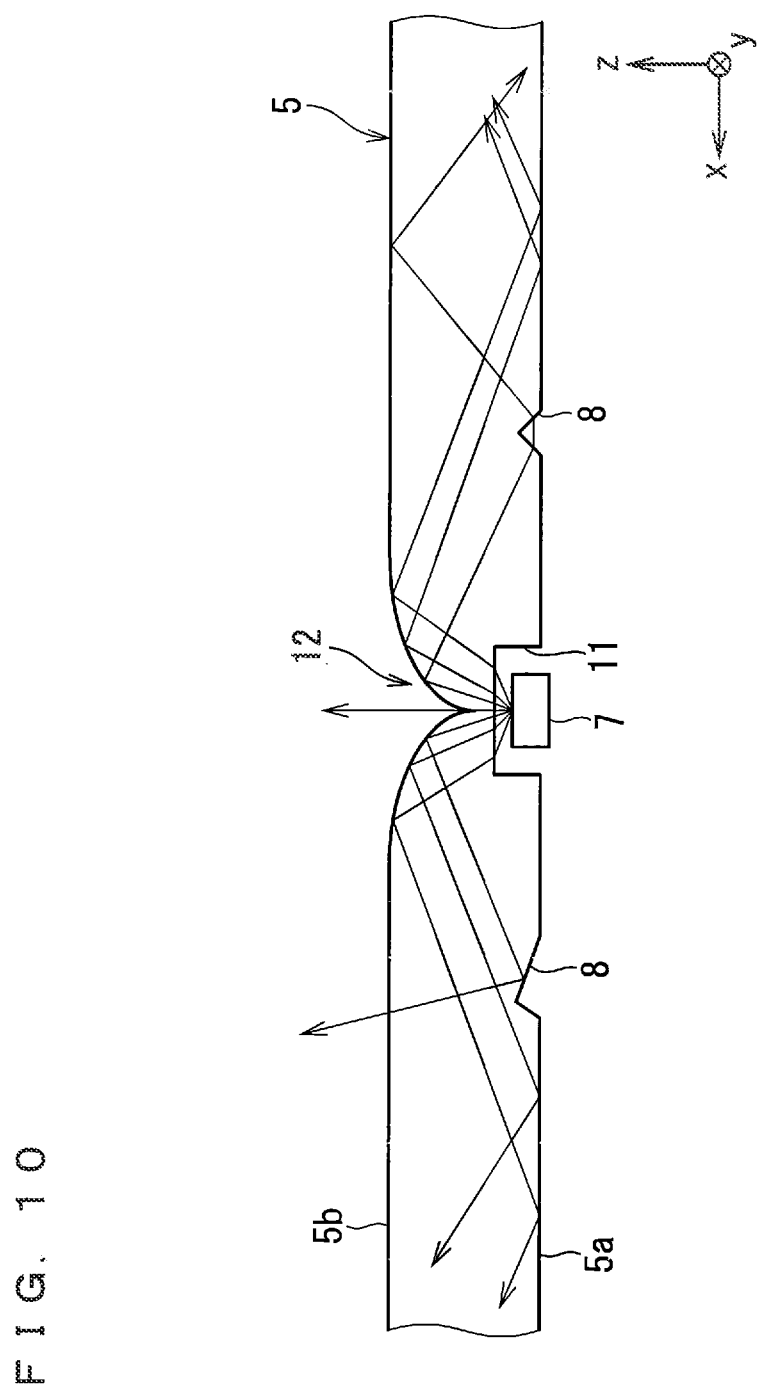
FIG. 10 is a configuration view schematically showing functions of a light emitting portion and a recessed structure portion according to the third preferred embodiment.

Next, a liquid crystal display device 100 and a surface light source device 500 according to a third preferred embodiment will be described. FIG. 9 is a perspective view schematically showing a structure according to an example of the liquid crystal display device 100 in accordance with the third preferred embodiment and FIG. 10 is a configuration view schematically showing functions of a light incident portion 11 and a recessed structure portion 12. In the third preferred embodiment, the same components as those described in the first and second preferred embodiments have the same reference numerals and explanation thereof will be omitted.

As shown in FIG. 9, in the third preferred embodiment, a light guide body 5 includes a recessed structure portion 12 in the structure according to the first preferred embodiment. The recessed structure portion 12 is provided in a corresponding position to the light incident portion 11 on an upper surface 5b of the light guide body 5, and has a gentle curved surface which is concaved toward the light incident portion 11 side.

In the same manner as in the second preferred embodiment, also in the third preferred embodiment, in order to reduce color irregularity in the surface light source device 500, it is preferable that light emitted from LEDs 6 and 7 should be taken into the light guide body 5 as much as possible because the light is monochromatic, be propagated and be emitted out of the light guide body 5 so as to have the same luminance distribution of each of the LEDs 6 and 7 as greatly as possible. In order to take the light emitted from the LEDs 6 and 7 into the light guide body 5 still more efficiently, moreover, the light emitted from the LEDs 6 and 7 is required to be refracted up to an angle that is a totally reflecting condition of acryl, a resin or the like to be a material of the light guide body 5 in such a manner that incident light is totally reflected by the upper surface 5b when the emitted light is incident on the light guide body 5 from a bottom surface 5a of the light guide body 5.

The recessed structure portion 12 is disposed on an opposite surface to the light incident portion 11 and is formed to have a gentle curved surface. As shown in FIG. 9, consequently, the recessed structure portion 12 has a function as follows. Specifically, out of the light emitted from the LEDs 6 and 7 and incident in the light guide body 5, the recessed structure portion 12 refracts light, which originally does not satisfy totally reflecting conditions and is transmitted in a +z-axis direction, in ±x directions over the gentle curved surface, thereby changing the light into light satisfying the totally reflecting conditions and propagating the changed light to the inner part of the light guide body 5. By this structure, a quantity of the light transmitted from the centers of the LEDs 6 and 7 through the light guide body 5 to come directly upward is decreased, and a quantity of the light propagated to the inner part of the light guide body 5 by total reflection is increased.

When the quantity of the light propagated to the inner part of the light guide body 5 is increased, a quantity of the light emitted to the outside of the light guide body 5 after luminance distribution is controlled by a light emitting portion 8 is increased in the same manner as in the second preferred embodiment. Therefore, the color irregularity of the whole light guide body 5 can be thus reduced. Moreover, the luminance of the whole light guide body 5 can be increased, and the quantity of the light emitted by the light emitting portion 8 can also be controlled easily. Therefore, luminance unevenness can be thus reduced.

In order to efficiently divide the light of the LEDs 6 and 7 in the ±x directions by the recessed structure portion 12, it is desirable that the curved surface of the recessed structure portion 12 should have a high curvature and be provided within a wide range to cover the light from the LEDs 6 and 7 to be originally leaking light. When the recessed structure portion 12 and the light incident portion 11 communicate with each other, moreover, a cavity is formed on the light guide body 5. For this reason, it is necessary to provide a minimum clearance between the recessed structure portion 12 and the light incident portion 11. Moreover, it is desirable that an apex part to be the most recessed portion which is the center of the recessed structure portion 12 should have an angle that is as small as possible. As shown in FIG. 10, an apex part having a small angle is present. Therefore, it is possible to reduce a quantity of light transmitted just above the LEDs 6 and 7. The light from the LEDs 6 and 7 can be divided in the ±x directions by the curved surface of the recessed structure portion 12. Therefore, still more light can be propagated to the inner part of the light guide body 5.

As described above, in the surface light source device 500 according to the third preferred embodiment, the light guide body 5 is provided in the corresponding position to the light incident portion 11 in the upper surface 5b (the emitting surface), and is further provided with the recessed structure portion 12 having the curved surface which is concaved toward the light incident portion 11 side. Therefore, the quantity of the light transmitted from the centers of the LEDs 6 and 7 through the light guide body 5 and passing directly upward is decreased and the quantity of the light propagated to the inner part of the light guide body 5 by the total reflection is increased. Consequently, a quantity of the light emitted to the outside of the light guide body 5 after luminance distribution is controlled by a light emitting portion 8 is increased. Therefore, the color irregularity of the whole light guide body 5 can be thus reduced. Moreover, the luminance of the whole light guide body 5 can be increased, and the quantity of the light emitted by the light emitting portion 8 can also be controlled easily. Therefore, luminance unevenness can be thus reduced.

Fourth Preferred Embodiment

Figure 11:
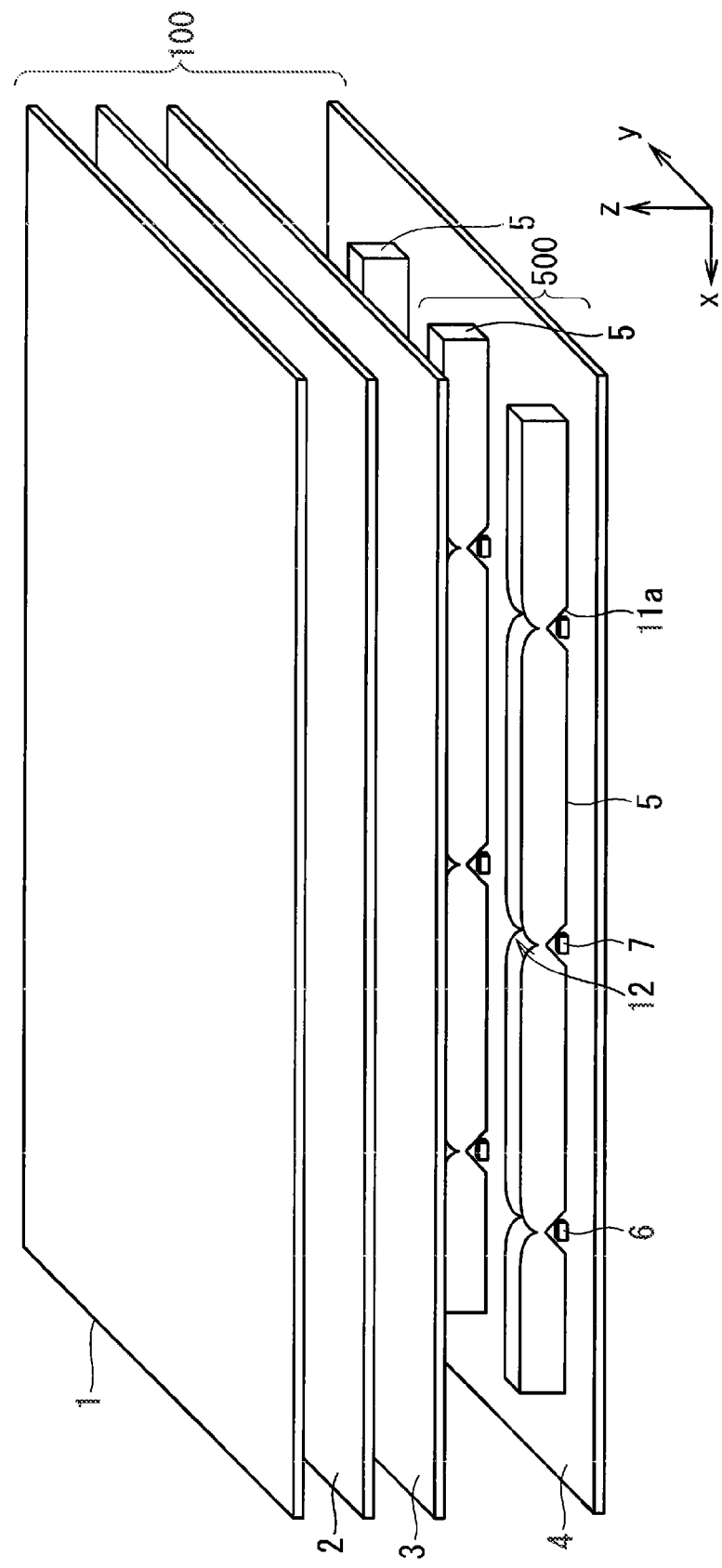
FIG. 11 is a perspective view schematically showing a structure according to an example of a liquid crystal display device in accordance with a fourth preferred embodiment.
Figure 12:
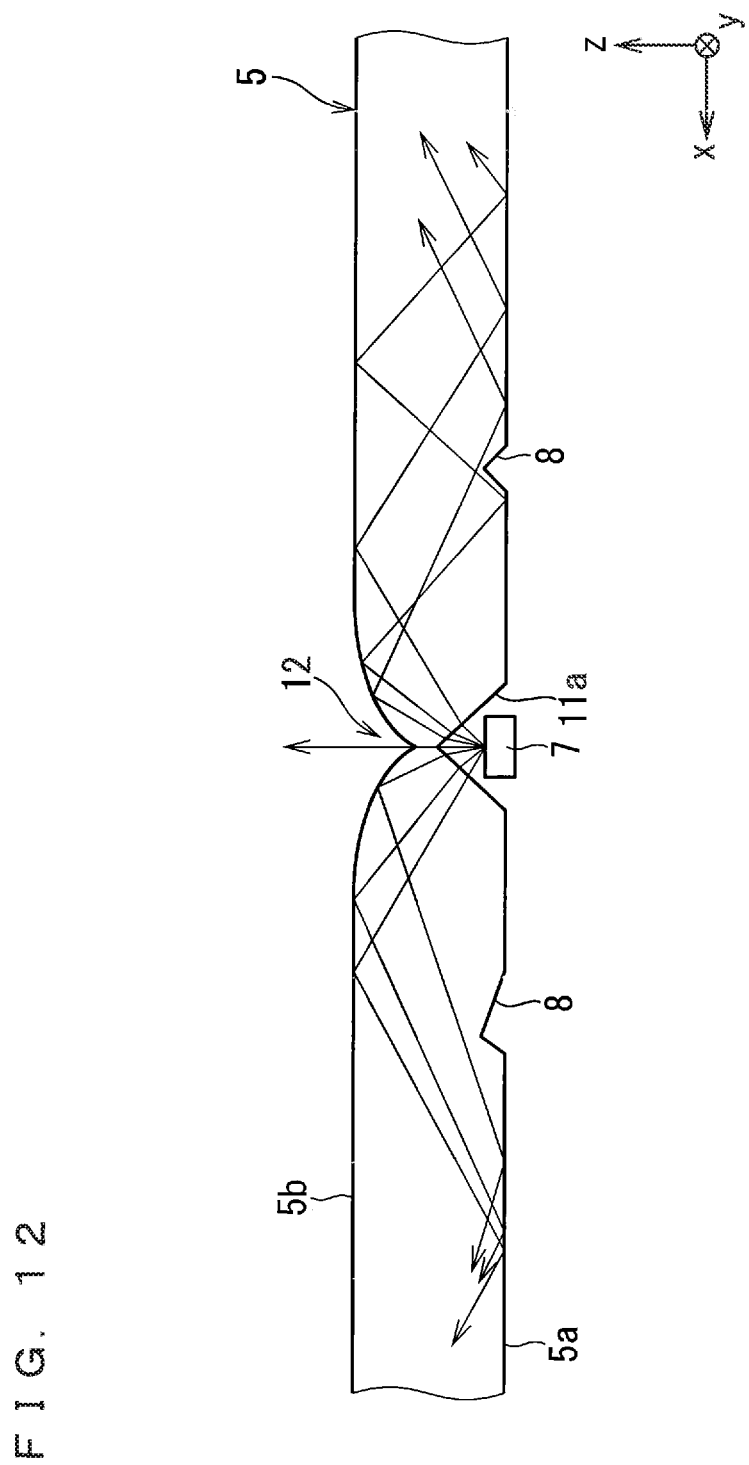
FIG. 12 is a configuration view schematically showing functions of a light incident portion and a recessed structure portion according to the fourth preferred embodiment.

Next, a liquid crystal display device 100 and a surface light source device 500 according to a fourth preferred embodiment will be described. FIG. 11 is a perspective view schematically showing a structure according to an example of the liquid crystal display device 100 in accordance with the fourth preferred embodiment, and FIG. 12 is a configuration view schematically showing functions of a light incident portion 11a and a recessed structure portion 12. In the fourth preferred embodiment, the same components as those described in the first to third preferred embodiments have the same reference numerals and explanation thereof will be omitted.

As shown in FIG. 11, in the fourth preferred embodiment, a light guide body 5 includes both a light incident portion 11a having the structure according to the second preferred embodiment and a recessed structure portion 12 having the structure according to the third preferred embodiment.

In the same manner as in the fourth preferred embodiment, also in the second and third preferred embodiments, in order to reduce color irregularity in the surface light source device 500, it is preferable that light emitted from LEDs 6 and 7 should be taken into the light guide body 5 as much as possible because the light is monochromatic, be propagated and be emitted out of the light guide body 5 so as to have the same luminance distribution of each of the LEDs 6 and 7 as greatly as possible. In order to take the light emitted from the LEDs 6 and 7 into the light guide body 5 still more efficiently, moreover, the light emitted from the LEDs 6 and 7 is required to be refracted up to an angle that is a totally reflecting condition of acryl, a resin or the like to be a material of the light guide body 5 in such a manner that incident light is totally reflected by the upper surface 5b when the emitted light is incident on the light guide body 5 from a bottom surface 5a of the light guide body 5.

As shown in FIG. 12, in the fourth preferred embodiment, light propagated from the LEDs 6 and 7 to the inner part of the light guide body 5 is divided in directions by an inclined surface of a triangular prism of the light incident portion 11a, and furthermore, the light divided in the ±x directions is refracted and is thus changed to light satisfying totally reflecting conditions by the curved surface of the recessed structure portion 12, and is propagated to the inner part of the light guide body 5. By the light incident portion 11a and the recessed structure portion 12, the light from the LEDs 6 and 7 is prevented from being transmitted through the upper surface 5b of the light guide body 5. Consequently, the light from the LEDs 6 and 7 which cannot be covered in the second and third preferred embodiments can be taken into the light guide body 5 still more.

Even if an angle of the inclined surface of the light incident portion 11a is reduced to some degree, moreover, transmitted light can be prevented by the recessed structure portion 12. Therefore, a likelihood is produced in a design for forming the light guide body 5. Similarly, a likelihood is also produced in a curvature of the curved surface of the recessed structure portion 12. By these structures, a quantity of light transmitted from the centers of the LEDs 6 and 7 through the light guide body 5 and passing directly upward is decreased and a quantity of the light propagated to the inner part of the light guide body 5 by the total reflection is increased.

Consequently, the quantity of the light emitted to the outside of the light guide body 5 after luminance distribution is controlled by a light emitting portion 8 is increased. Therefore, the color irregularity of the whole light guide body 5 can be thus reduced. Moreover, the luminance of the whole light guide body 5 can be increased, and the quantity of the light emitted by the light emitting portion 8 can also be controlled easily. Therefore, luminance unevenness can be thus reduced.

As described above, in the surface light source device 500 according to the fourth preferred embodiment, the light propagated from the LEDs 6 and 7 to the inner part of the light guide body 5 is divided in the ±x directions by the inclined surface of the triangular prism of the light incident portion 11a, and furthermore, the light divided in the ±x directions is refracted and is thus changed to the light satisfying the totally reflecting conditions by the curved surface of the recessed structure portion 12, and is propagated to the inner part of the light guide body 5. By the light incident portion 11a and the recessed structure portion 12, the light from the LEDs 6 and 7 is prevented from being transmitted through the upper surface 5b of the light guide 5. Consequently, the light from the LEDs 6 and 7 can be taken into the light guide body 5 still more.

While the invention has been shown and described in detail, the foregoing description is in all aspects illustrative and not restrictive. It is therefore understood that numerous modifications and variations can be devised without departing from the scope of the invention.

What is claimed is:

1. A surface light source device comprising:
    a plurality of light sources for emitting a plurality of light having different colors; and
    a light guide body for mixing the colors of said plurality of light and emitting light having colors mixed,
    wherein said light guide body includes,
        recessed light incident portions for causing said plurality of light to be individually incident, said plurality of light sources being disposed within respective ones of said plurality of light incident portions, and
        at least one light emitting portion provided beside one of said light incident portions and for changing propagation angles of said plurality of light, which is incident from said light incident portion and propagated into said light guide body to mix colors, thereby controlling a quantity of light emission from said light guide body and a light emitting position.

2. A surface light source device comprising:
    a plurality of light sources for emitting a plurality of light having different colors; and
    a light guide body for mixing the colors of said plurality of light and emitting light having colors mixed, wherein
    said light guide body includes a light incident portion for causing said plurality of light to be individually incident, and a light emitting portion provided beside said light incident portion and for changing propagation angles of said plurality of light, which is incident from said light incident portion and propagated into said light guide body to mix colors, thereby controlling a quantity of light emission from said light guide body and a light emitting position,
    said light incident portion is provided on an incident surface side of said light guide body, and
    said light emitting portion is provided on said incident surface side of said light guide body and controls a quantity of light emission from an emitting surface on an opposite side to said incident surface and said light emitting position.

3. The surface light source device according to claim 2, wherein said light emitting portion is formed into a recessed portion having a triangular prism shape with said emitting surface side of said light guide body set to be an apex.

4. The surface light source device according to claim 3, wherein said light emitting portion includes a triangular prism shape having different angles of sides.

5. The surface light source device according to claim 2, wherein said light incident portion is formed into a recessed portion having a triangular prism shape with said emitting surface side of said light guide body set to be an apex.

6. The surface light source device according to claim 2, wherein said light guide body further includes a recessed structure portion being provided in a corresponding position to said light incident portion in said emitting surface and having a curved surface concaved toward said light incident portion side.

7. A liquid crystal display device comprising:
    the surface light source device according to claim 1; and
    a liquid crystal panel for displaying an image by illumination of light from said surface light source device.

* * * * *